United States Patent
Smith

(10) Patent No.: US 6,724,278 B1
(45) Date of Patent: Apr. 20, 2004

(54) DUPLEX FILTERING

(75) Inventor: Christopher Nigel Smith, Romsey (GB)

(73) Assignee: Roke Manor Research Limited, Hampshire (GB)

( * ) Notice: Subject to any disclaimer, the term of this patent is extended or adjusted under 35 U.S.C. 154(b) by 0 days.

(21) Appl. No.: 09/889,671
(22) PCT Filed: Dec. 17, 1999
(86) PCT No.: PCT/GB99/04291
§ 371 (c)(1), (2), (4) Date: Nov. 13, 2001
(87) PCT Pub. No.: WO00/44102
PCT Pub. Date: Jul. 27, 2000

(30) Foreign Application Priority Data

Jan. 19, 1999 (GB) .............................................. 9901014

(51) Int. Cl.[7] ................................................ H03H 9/72
(52) U.S. Cl. ........................ 333/133; 333/134; 333/193; 333/101
(58) Field of Search ................................ 333/995, 205, 333/219, 235, 159, 200, 133, 132, 134, 101; 505/700, 701, 866, 210, 204

(56) References Cited

U.S. PATENT DOCUMENTS

| | | | |
|---|---|---|---|
| 4,792,939 A | 12/1988 | Hikita et al. | .................. 370/24 |
| 5,365,207 A | * 11/1994 | Borras et al. | ................ 333/196 |
| 5,786,738 A | 7/1998 | Ikata et al. | .................. 333/133 |
| 5,864,260 A | 1/1999 | Lee | |
| 5,905,418 A | * 5/1999 | Ehara et al. | ................ 333/193 |
| 6,014,571 A | 1/2000 | Enoki | |
| 6,483,399 B1 | * 11/2002 | Atokawa | .................... 333/133 |

FOREIGN PATENT DOCUMENTS

| | | |
|---|---|---|
| EP | 0678974 | 10/1995 |
| EP | 0 820 155 A2 | 7/1997 |
| EP | 0 823 751 A2 | 8/1997 |
| EP | 0 829 915 A2 | 9/1997 |
| JP | 9307399 | 11/1997 |
| KR | 1998-0007145 | 3/1998 |
| WO | 97/43827 | 11/1997 |

OTHER PUBLICATIONS

Copy of PCT International Search Report.
Copy of British Search Report.
United Kingdom Office Action.
Korean Office Action.

* cited by examiner

Primary Examiner—Robert Pascal
Assistant Examiner—Kimberly E Glenn
(74) Attorney, Agent, or Firm—Crowell & Moring LLP

(57) ABSTRACT

An arrangement for multi-standard duplex filtering for mobile terminals in a telecommunications system. The arrangement includes a substrate on which a first array of filter elements and a second array of filter elements are formed. The filter elements have different frequency bands in accordance with mobile telecommunications standards. The first array filters an incoming signal received from an antenna and provides an output at port in accordance with a matched frequency band of one of the standards. The second array filters a signal to be applied to port in accordance with a matched frequency band of one of the standards prior to transmission through antenna. The filter elements may comprise surface acoustic wave devices formed on a single substrate.

9 Claims, 4 Drawing Sheets

DUPLEX FILTERING

BACKGROUND OF THE INVENTION

The present invention relates to improvements in or relating to duplex filtering, and is more particularly, although not exclusively, concerned with transmit/receive duplex filtering for multi-standard mobile terminals.

Conventional single standard systems operate on a single specific frequency band and include a duplex filter arrangement which comprises two filter elements sharing a common port at an antenna connection. One of the filter elements handles the transmit band and the other filter element handles the receive band, both filter elements being designed such that interaction between the two filter elements can be achieved.

However, in multi-standard systems, the duplex filter arrangement must cover a number of different frequency bands. Multi-standard systems are currently implemented by using a different, separate duplex filter arrangement for each standard. Such systems are expensive and incur a size penalty.

SUMMARY OF THE INVENTION

It is therefore an object of the present invention to provide an improved duplex filter arrangement which comprises multiple filter elements on a single substrate.

In accordance with one aspect of the present invention, there is provided a duplex filtering arrangement comprising:

antenna means for receiving and transmitting signals;

first filtering means for filtering the received signals;

second filtering means for filtering the signals to be transmitted;

characterised in that the first and second filtering means each comprises an array of filter elements formed on a single substrate, the filter elements having different frequency bands in accordance with a plurality of mobile communications standards.

Other objects, advantages and novel features of the present invention will become apparent from the following detailed description of the invention when considered in conjunction with the accompanying drawings.

DETAILED DESCRIPTION OF THE INVENTION

The present invention will be described with reference to a mobile terminal operating in a mobile telecommunications network, but it will readily be appreciated that the invention is equally applicable to any situation where transmit/receive duplex filtering is required to be implemented.

Figure 1:
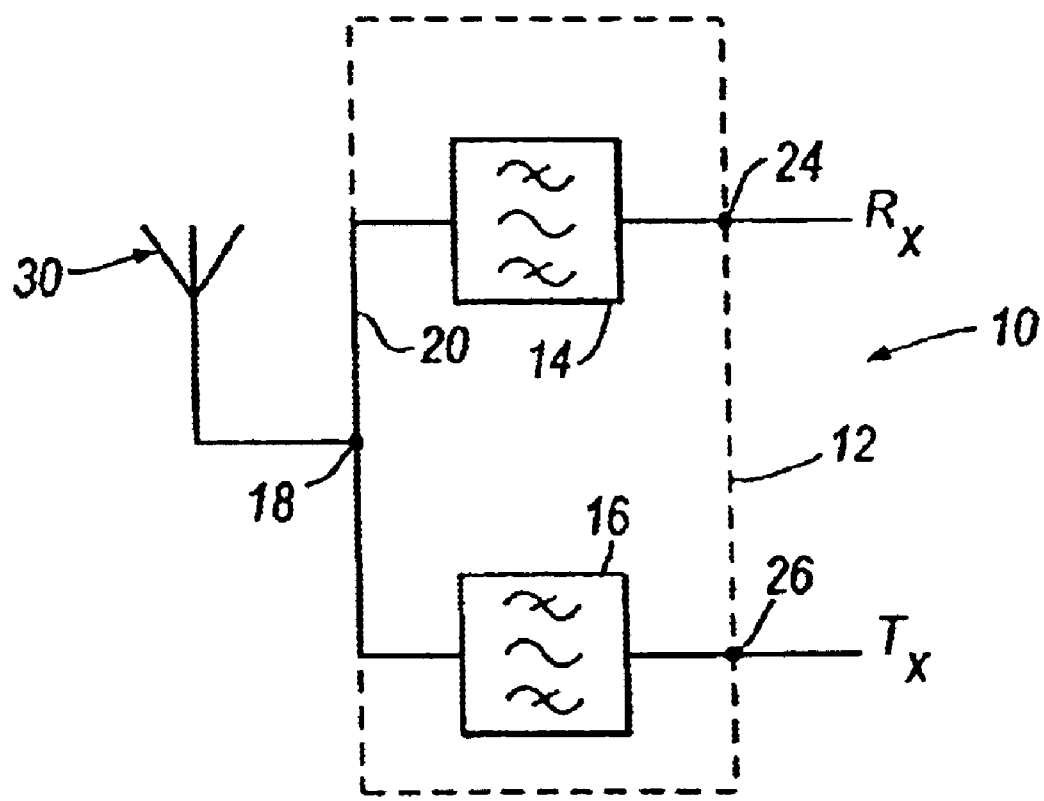
FIG. 1 illustrates a block diagram of a conventional duplex filter arrangement.

FIG. 1 illustrates a conventional duplex filter arrangement 10 which utilises three ports. The arrangement 10 comprises a substrate 12 on which is formed a receiving filter 14 and a transmitting filter 16 connected to a common input port 18 by means of connections 20 and 22 respectively. Port 18 comprises an antenna connection and is also connected to antenna 30 which is used for both receiving and transmitting signals. Receiving filter 14 and transmitting filter 16 are connected to respective ports 24, 26 as shown. Receiving filter 14 handles a predetermined receiving frequency band and transmitting filter 16 handles a predetermined transmitting frequency band for a mobile terminal. Normally, the receive frequency band and transmit frequency band are different.

Figure 2:
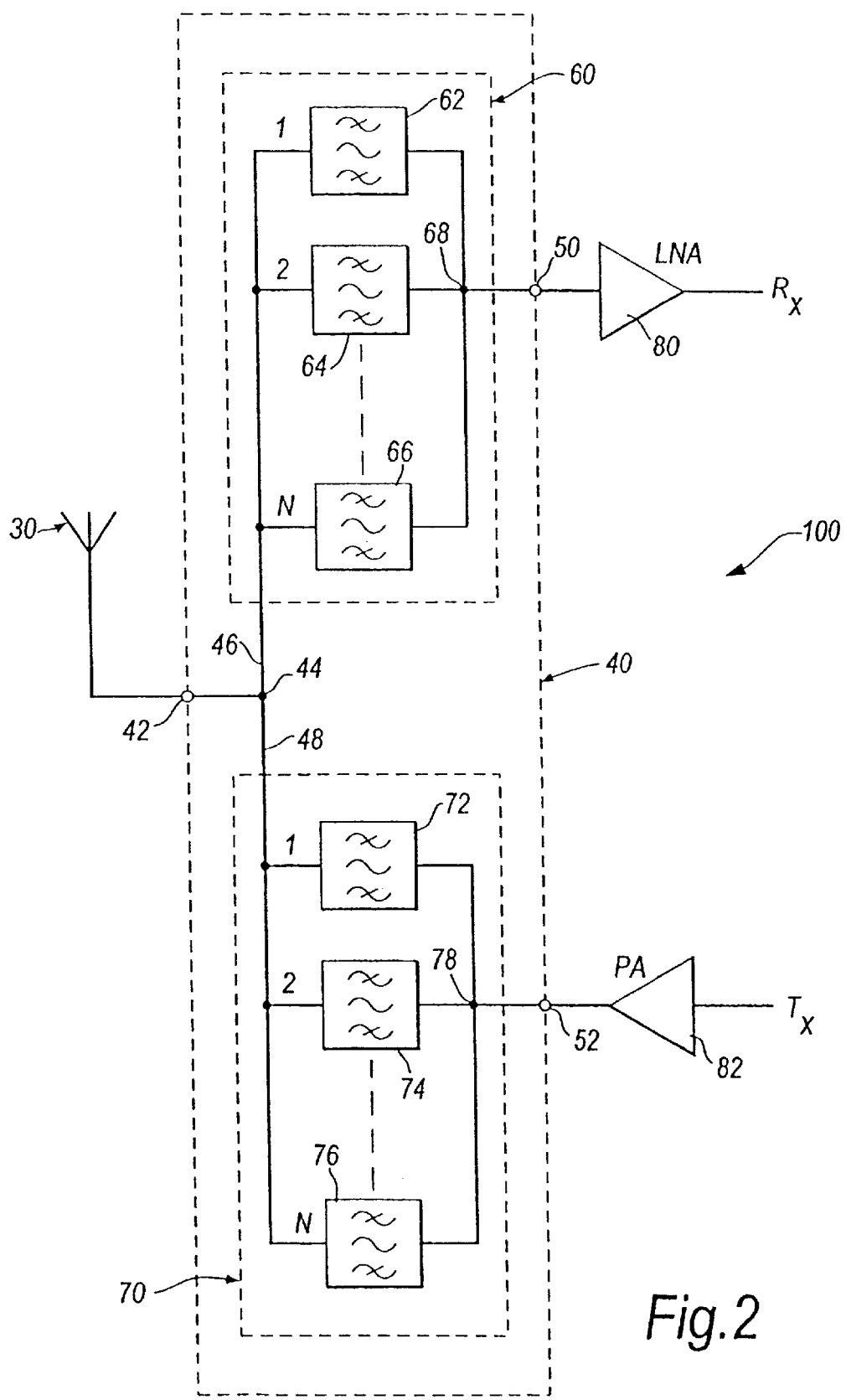
FIG. 2 illustrates a block diagram of a first embodiment of a multi-standard duplex filter arrangement in accordance with the present invention.

FIG. 2 illustrates one embodiment of a multi-standard duplex filter arrangement 100 in accordance with the present invention in which three ports are utilised. Here, antenna 30 is connected to a connection port 42 of substrate 40 on which two filter arrays 60, 70 are provided. Connection port 42 is connected to a common port 44 which is connected to receiving filter array 60 by connection 46 and to transmitting filter array 70 by connection 48. Each filter array 60, 70 has a single port 68, 78 which is connected to a respective one of ports 50, 52 of the substrate 40 as shown, port 50 being connected to a receiving amplifier 80 and port 52 being connected to a transmitting amplifier 82. Receiving amplifier 80 may be a low noise amplifier (LNA) and transmitting amplifier 82 may be a power amplifier (PA).

Filter array 60 comprises a plurality of filter elements 62, 64, 66—each filter element 62, 64, 66 operating in a predetermined discrete frequency band and each filter element may comprise a surface acoustic wave (SAW) device formed on the substrate 40. Similarly, filter array 70 comprises a plurality of filter elements 72, 74, 76—each filter element 72, 74, 76 operating in a predetermined discrete frequency band and each filter element may comprise a SAW device formed on the substrate 40. As each filter element 62, 64, 66, 72, 74, 76 operates in a predetermined discrete frequency band, there is no overlap of frequencies. It will readily be appreciated that although three filter elements are shown in each array, two filter elements or more than three filter elements can be utilised according to the number of standards, and hence frequency bands, to be received and transmitted.

When operating in the receiving mode, an incoming signal from the antenna 30 is passed to all of the filter elements 62, 64, 66 via ports 42, 44 and connection 46. An output signal will be provided at port 68 of the filter array 60, and hence at port 50, from the filter element which is matched to the incoming signal frequency.

Similarly, when operating in the transmitting mode, a signal which is to be transmitted is passed to port 52 and then to all of the filter elements 72, 74, 76 via port 78. However, a signal for transmission will be only be provided on connection 48 from the filter element which is matched to the transmitting signal frequency, the signal for transmission passing to the antenna 30 via ports 44 and 42.

Figure 3:
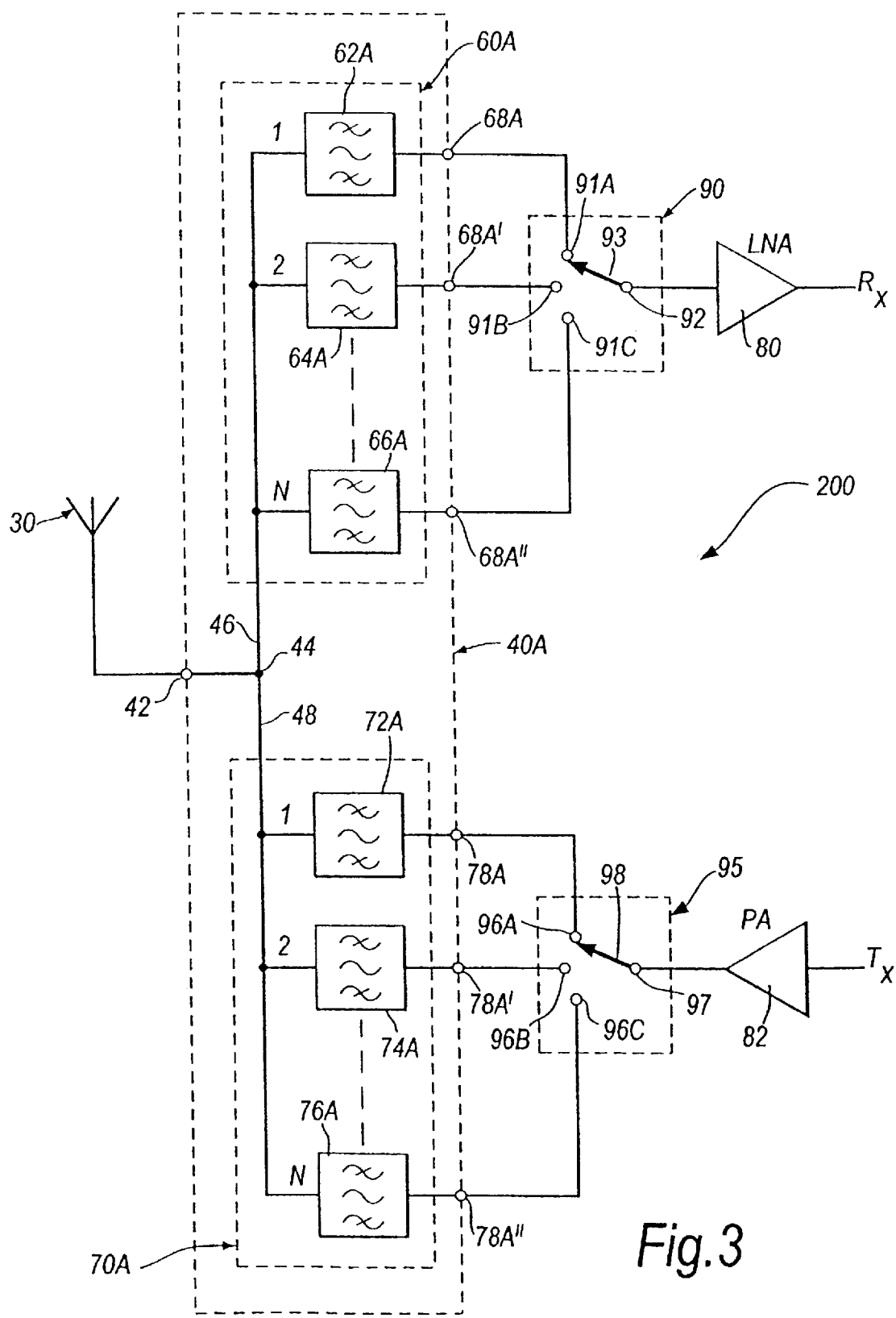
FIG. 3 illustrates a block diagram of a second embodiment of a multi-standard duplex filter arrangement in accordance with the present invention.

However, if it is intended that the mobile terminal operate in overlapping frequency bands, multi-standard duplex arrangement 200 shown in FIG. 3 can be implemented. Components which are identical to those described above with reference to FIG. 2 are numbered the same. Components which are similar to those described above with reference to FIG. 2 have the suffix 'A'.

In FIG. 3, substrate 40A has two filter arrays 60A, 70A formed on it. Filter array 60A is similar to filter array 60 described above with reference to FIG. 2, but each filter element 62A, 64A, 66A is connected to a respective one of output ports 68A, 68A', 68A" as shown. Each output port 68A, 68A', 68A" is connected to a switch 90. Switch 90 comprises a plurality of terminals 91A, 91B, 91C and 92, terminals 91A, 91B, 91C being connectable to terminal 92 by means of a movable member 93. Terminal 92 is connected to receiving amplifier 80 as shown. Each port 68A, 68A', 68A" of filter array 60A is connected to a respective one of the terminals 91A, 91B, 91C as shown.

Similarly, filter array 70A is similar to filter array 70 described above with reference to FIG. 2, but each filter element 72A, 74A, 76A is connected to a respective port 78A, 78A', 78A" as shown. Each port 78A, 78A', 78A" is connected to a switch 95. Switch 95 comprises a plurality of terminals 96A, 96B, 96C and 97, terminals 96A, 96B, 96C being connectable to terminal 97 by means of a movable member 98. Terminal 97 is connected to transmitting amplifier 82 as shown. Each port 78A, 78A', 78A" of filter array 70A is connected to a respective one of the terminals 96A, 96B, 96C as shown. Movable members 93, 98 are controlled by a controller (not shown) to move them between terminals 91A, 91B, 91C and 96A, 96B, 96C respectively so that appropriate filter elements can be connected to the incoming signal and to the signal to be transmitted in accordance with predetermined standards.

When operating in the receiving mode, an incoming signal from the antenna 30 is passed to all of the filter elements 62A, 64A, 66A via ports 42, 44 and connection 46. A plurality of output signals may be provided at ports 68A, 68A', 68A" of the filter array 60A. Movable member 93 is operated to connect terminal 92 with one of the terminals 91A, 91B, 91C thereby selecting a filter element which is matched to the incoming signal frequency. In the illustrated embodiment, movable member 93 in switch 90 connects terminals 91A and 92 selecting port 68A and filter element 62A. The filtered signal is then passed to LNA 80 and on for further processing.

Similarly, when operating in the transmitting mode, a signal which is to be transmitted is passed to PA 82 and then to terminal 97 in switch 95. Movable member 98 is positioned to connect with an appropriate one of the terminals 96A, 96B, 96C so that the signal is passed to the corresponding port 78A, 78A', 78A", through the selected filter element 72A, 74A, 76A, to common port 44 via connection 48 and then to port 42 and antenna 30. In the illustrated embodiment, movable member 98 connects terminals 96A and 97 selecting port 78A and filter element 72A.

Figure 4:
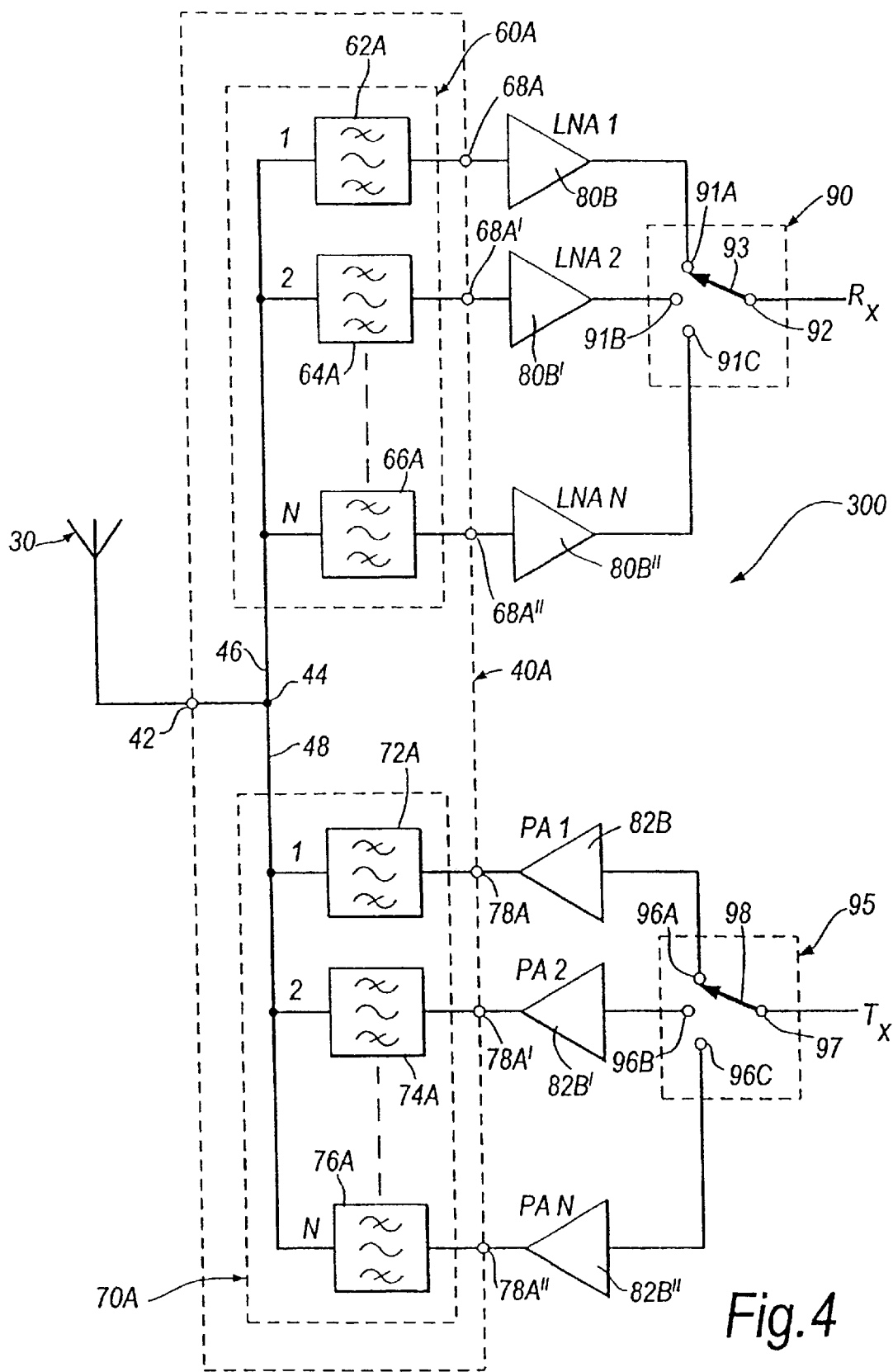
FIG. 4 illustrates a block diagram of a third embodiment of a multi-standard duplex filter arrangement in accordance with the present invention.

However, if the mobile terminal operates in frequency bands where there is a large frequency difference between some of the bands, then multi-standard duplex arrangement 300 shown in FIG. 4 can be implemented. Components which are identical to those described above with reference to FIG. 2 or 3 are numbered the same. Components which are similar to those described above with reference to FIG. 3 have the suffix 'B'.

In FIG. 4, substrate 40A has two filter arrays 60A, 70A formed on it as described above. Filter array 60A comprises a plurality of filter elements 62A, 64A, 66A, each filter element 62A, 64A, 66A being connected to a respective one of output ports 68A, 68A', 68A" as shown. Output ports 68A, 68A', 68A" are connected to respective LNAs 80B, 80B', 80B" which, in turn, are connected to switch 90. Switch 90 comprises a plurality of terminals 91A, 91B, 91C and 92, terminals 91A, 91B, 91C being connectable to terminal 92 by means of a movable member 93.

Similarly, filter array 70A is similar to filter array 70 described above with reference to FIG. 2, but each filter element 72A, 74A, 76A is connected to a respective port 78A, 78A', 78A" as shown. Ports 78A, 78A', 78A" are connected to PAs 82B, 82B', 82B" which, in turn, are connected to switch 95. Switch 95 comprises a plurality of terminals 96A, 96B, 96C and 97, terminals 96A, 96B, 96C being connectable to terminal 97 by means of a movable member 98. Terminals 96A, 96B, 96C are connected to ports 78A, 78A', 78A".

As described above with reference to FIG. 3, movable members 93, 98 are controlled by a controller (not shown) to move them between terminals 91B, 91C and 96A, 96B, 96C respectively so that appropriate filter elements can be connected to the incoming signal and to the signal to be transmitted in accordance with predetermined standards.

When operating in the receiving mode, an incoming signal from the antenna 30 is passed to all of the filter elements 62A, 64A, 66A via ports 42, 44 and connection 46. A plurality of output signals may be provided at ports 68A, 68A', 68A" of the filter array 60A which are then passed to LNAs 80B, 80B', 80B". Movable member 93 is operated to connect terminal 92 with one of the terminals 91A, 91B, 91C thereby selecting a filter element which is matched to the incoming signal frequency. In the illustrated embodiment, movable member 93 in switch 90 connects terminals 91A and 92— selecting LNA 80B and hence port 68A and filter element 62A. The filtered signal is then passed on for further processing.

Similarly, when operating in the transmitting mode, a signal which is to be transmitted is passed to terminal 97 of switch 95. Movable member 98 is positioned to connect with an appropriate one of the terminals 96A, 96B, 96C so that the signal is passed to the corresponding PA 82B, 82B', 82B" prior to passing to the associated port 78A, 78A', 78A", through the selected filter element 72A, 74A, 76A, to common port 44 via connection 48 and then to port 42 and antenna 30. In the illustrated embodiment, movable member 98 connects terminals 96A and 97 selecting PA 82B, port 78A and filter element 72A.

In the embodiment described with reference to FIG. 4, the LNAs and PAs are optimised to accommodate different frequency ranges.

It will be appreciated that the embodiments described in FIGS. 3 and 4 require more ports on the substrate 40A to accommodate the desired connections than that of the conventional duplex filtering arrangement shown in FIG. 1 and that of the embodiment of the invention shown in FIG. 2. However, the increased number of ports on a single substrate to effect multi-standard duplex filtering is still advantageous over a plurality of individual substrates one for each standard.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for duplex filtering for signals of each of a plurality of different mobile communication standards, the arrangement comprising:

antenna means for receiving and transmitting signals;

receiver filtering means for filtering the received signals;

transmitter filtering means for filtering the signals to be transmitted; wherein the receiver and transmitter filtering means each comprises an array of band pass filters formed on a single substrate, each filter in the receiver filtering means having a frequency pass band that accords with a respective one of the plurality of mobile communications standards, and each filter in the transmitter filtering means having a frequency pass band that accords with a respective one of the plurality of mobile communications standards.

2. An arrangement according to claim 1, further including first and second amplifier means for amplifying the received signal and the signal to be transmitted respectively.

3. An arrangement according to claim 2, wherein the first amplifier means comprises at least one low noise amplifier.

4. An arrangement according to claim 2, wherein the second amplifier means comprises at least one power amplifier.

5. An arrangement according to claim 1, wherein the frequency bands are discrete.

6. An arrangement according to claim 1, wherein the frequency bands overlap.

7. An arrangement according to claim 6, further comprising first and second switching means for selecting filter elements in the receiver and transmitter filtering means respectively in accordance with the mobile communications standards.

8. An arrangement according to claim 7, wherein the first switching means operates on the received signal prior to amplification, and the second switching means operates on the amplified signal to be transmitted.

9. A mobile terminal having an arrangement for duplex filtering for signals of each of a plurality of different mobile communication standards, the arrangement comprising:

antenna means for receiving and transmitting signals;

receiver filtering means for filtering the received signals;

transmitter filtering means for filtering the signals to be transmitted; wherein the receiver and transmitter filtering means each comprises an array of band pass filters formed on a single substrate, each filter in the receiver filtering means having a frequency pass band that accords with a respective one of the plurality of mobile communications standards, and each filter in the transmitter filtering means having a frequency pass band that accords with a respective one of the plurality of mobile communications standards.

* * * * *